(No Model.) 3 Sheets—Sheet 1.

W. P. BROWN.
WHEEL CULTIVATOR.

No. 326,200. Patented Sept. 15, 1885.

Witnesses:
Jas. F. DuHamel
W. H. Shipley

Inventor:
W. P. Brown
By Phil. T. Dodge
Attorney

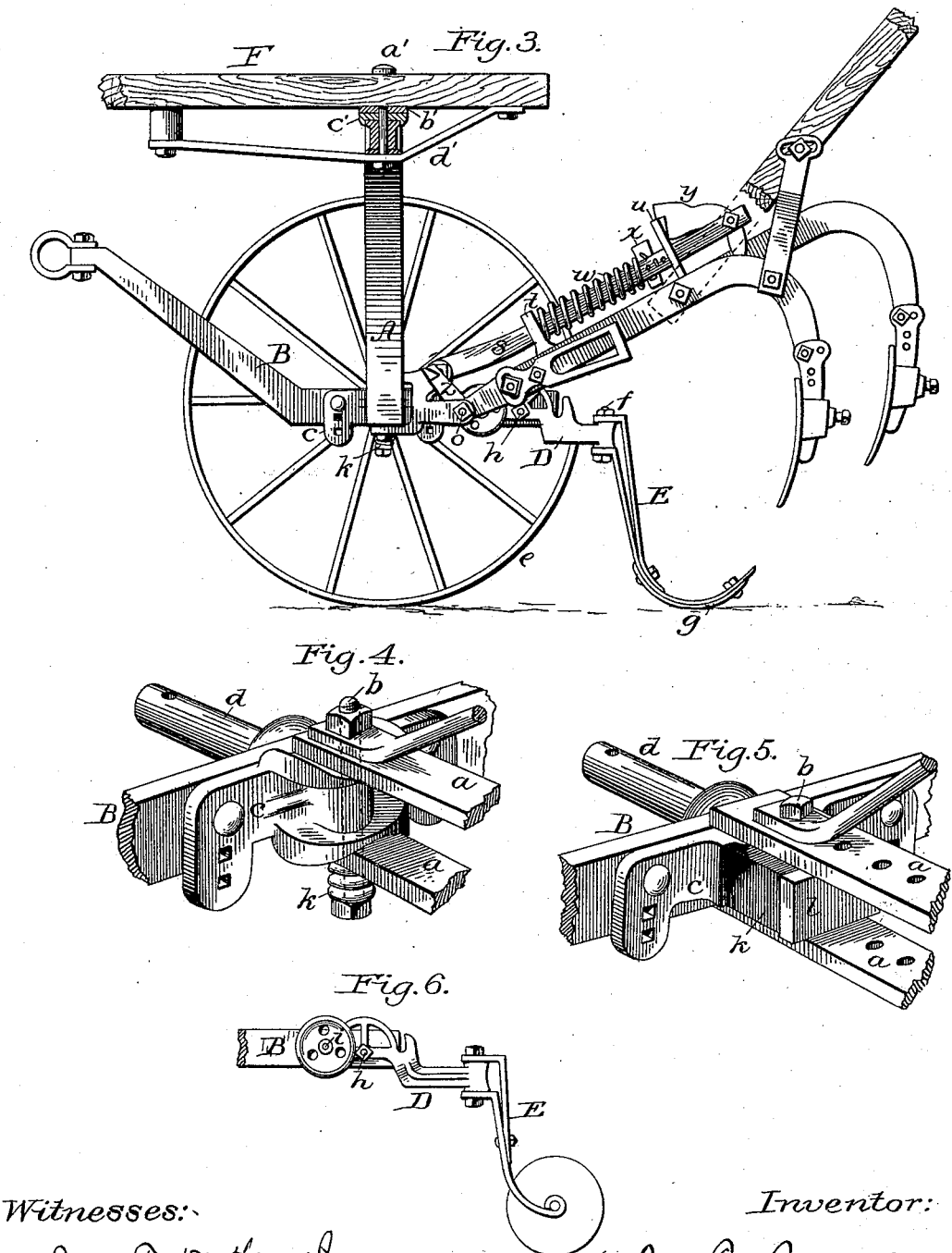

(No Model.) 3 Sheets—Sheet 3.
W. P. BROWN.
WHEEL CULTIVATOR.
No. 326,200. Patented Sept. 15, 1885.
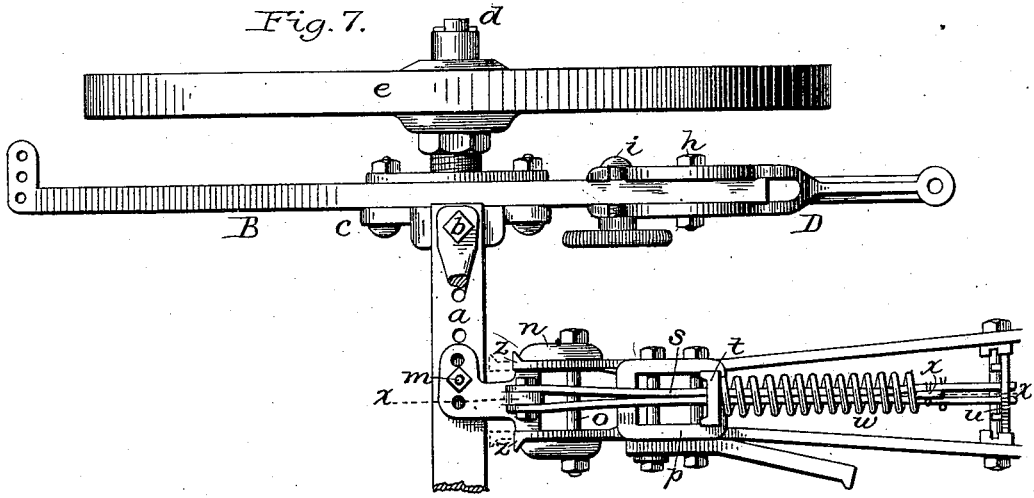
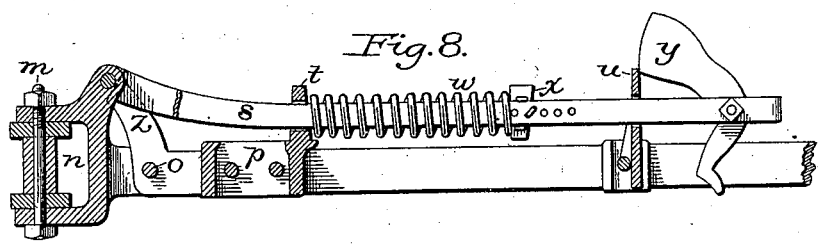
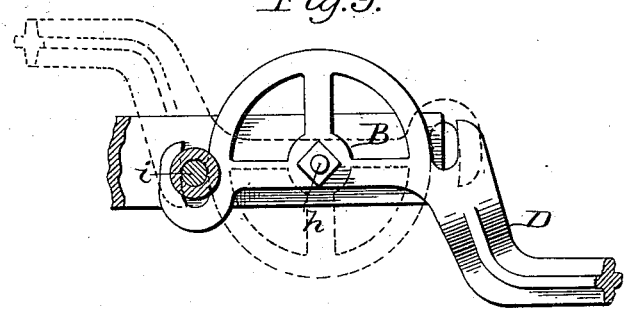
Witnesses:
Jas. F. DuHamel.
W. H. Shipley
Inventor:
W. P. Brown
By Phil. T. Dodge
Attorney

UNITED STATES PATENT OFFICE.

WILLIAM P. BROWN, OF ZANESVILLE, OHIO.

WHEEL-CULTIVATOR.

SPECIFICATION forming part of Letters Patent No. 326,200, dated September 15, 1885.

Application filed May 25, 1885. (No model.)

*To all whom it may concern:*

Be it known that I, WILLIAM P. BROWN, of Zanesville, in the county of Muskingum and State of Ohio, have invented certain Improvements in Wheeled Cultivators, of which the following is a specification.

This invention relates to what are commonly known in the art as "tongueless cultivators," the essential members of which are the arched axle or frame provided with sustaining-wheels, two plows or cultivators jointed to the ends of the axle in such manner that they may move forward and backward independently of each other, and draft devices whereby the two draft-animals are enabled to draw the respective plows independently.

The improvements have reference to trailing runners for maintaining the arched axle in an upright position; to an improved spring attachment to assist the operator in lifting the plows; to a spring-connection which aids in holding the wheels in the line of draft; to a tongue and its connections adapted for use when required, and to various minor matters, which will be hereinafter explained in full, and specifically claimed.

Figure 1:
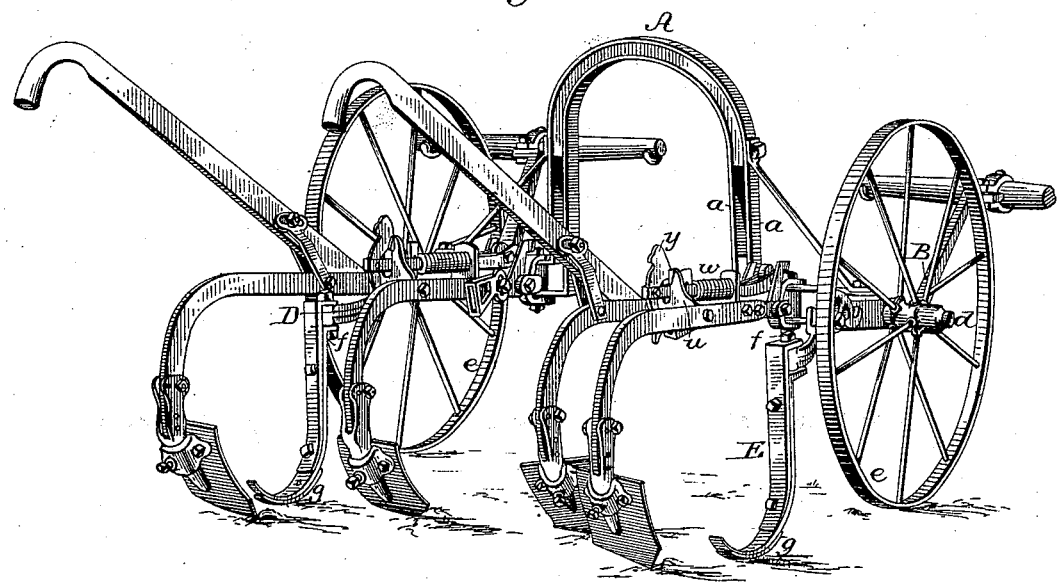
Figure 2:
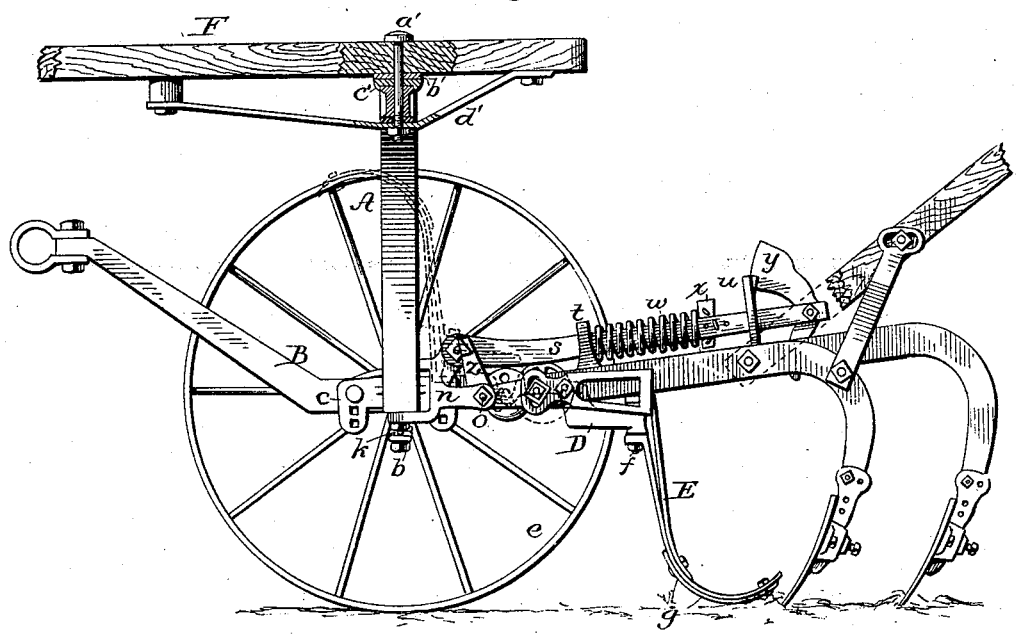

Referring to the drawings, Figure 1 represents a perspective view of my improved machine in an operative position. Fig. 2 is a longitudinal vertical section through the center of the machine in an operative position. Fig. 3 is a like view of the same, showing the plow lifted out of action. Figs. 4 and 5 are perspective views showing two methods of applying the spring by which the plows are held in the line of draft. Fig. 6 is a view showing the manner of attaching the trailing or caster wheel in place of the trailing runner. Fig. 7 is a top plan view of one side of the machine, exhibiting the manner of connecting the wheels, the runners, and the plows with the main frame or axle. Fig. 8 is a longitudinal vertical section on the line $x$ $x$ of the preceding figure. Fig. 9 is a view showing the manner in which the reversible runner is attached.

In the drawings, A represents an axle having a central portion arched upward and its two ends extended horizontally outward. This axle may be constructed of any suitable material, and in any appropriate manner; but I prefer to form the same, as shown in the drawings, of two parallel metal straps or bars, $a$, separated by intervening blocks, to which they are bolted.

In each end of the axle, between the two bars of which it is composed, I secure, by a vertical pivot, $b$, a plate or block, $c$, bolted or riveted firmly to an outside arm, B, which carries the axle $d$, on which the main or ground wheel $e$ is mounted. The arm B is extended forward and upward, and fashioned into a suitable form to receive draft devices $d$, which may be of any appropriate character.

It will be perceived that the wheel and its axle are free to swing horizontally about the vertical pivot $b$ as a center, and that by means of the draft applied through the arm B the wheel is kept constantly in a position parallel to the line of draft.

In order to keep the wheels from swinging out of position when the machine is at rest, or when they are relieved from the draft, I propose to make use of a spring attachment in connection with the wheel-carrying plate and main frame, in either of the two forms represented in Figs. 4 and 5.

In Fig. 4 the two arms $a$ of the axle are seated in V-shaped depressions in the upper and under sides of the axle-plate, and the pivot-bolt $b$, provided at its lower end with a spiral spring, $k$, which tends to urge the arms $a$ $a$ together, forcing them downward into the depressions of the block, so as to hold the latter in position. As the wheel swings out of position the rotation of the block $c$ separates the arms A, compressing the spring, which tends to bring the parts back to their normal position when released.

In Fig. 5 I have shown, in place of the spiral spring, a flat rubber spring, $k$, confined between the inner face of the axle-block $c$ and a stationary plate or bearing, $l$, so as to resist the motion of the block and return it to its normal position.

The arm B is extended backward beyond the axle, and bears at its rear extremity a rigid arm, D, which in turn carries at its rear end a runner, E, adapted to trail upon the surface of the ground, and thus prevent the arched axle or frame from tipping backward. The runner E is connected to the arm D by a vertical pivot, $f$, whereby it is permitted to swing laterally, and thus trail easily over the surface of the ground as the machine is turned or its course of travel changed. I prefer to construct the runner, as shown, of two metal bars bolted together, their upper ends being bent at a right angle above and below the arm D to receive the pivot. To the under side of the runner I apply a steel shoe, $g$, secured by bolts through its ends. This shoe is made reversible, end for end, so that when the front becomes worn the opposite end may be brought into position to receive the wear. The runner as a whole is commonly made of steel or other elastic material, so that it may yield to a limited extent and ride smoothly over inequalities in the surface without causing objectionable vibration of the machine. In place of the runner I may substitute, if desired, a trailing wheel or caster, attached in like manner to the arm D, as represented in Fig. 6.

In practical operations with the machine it is occasionally desirable to vary the height of the runners with respect to the other parts, and sometimes to throw the runners entirely out of action. To this end I connect the runner-carrying arms D to the arm of the main frame by a horizontal pivot, $h$, and secure it in position by means of a bolt, $i$, having a hand-nut on one end, as shown in Figs. 3, 7, and 9. The end of arm D is made of semicircular form and forked to embrace the end of arm B, and is notched, as shown, to straddle the clamping-bolt, that it may take a firm hold thereon. By loosening the bolt $i$ the runner may be set free, whereupon it may be adjusted vertically, or thrown upward and forward to a reverse position out of action, as shown in Figs. 2 and 9.

The foregoing parts constitute jointly a main frame, which is prevented by the runners from tipping backward, and either side of which may be drawn in advance of the other without destroying the parallelism of the wheels.

To each end of the arched frame I connect, by a vertical pivot-bolt, $m$, a forked plate, $n$, free to swing horizontally about the pivot, and within the rear end of this plate, which is divided vertically, I secure, by a horizontal pivot, $o$, a plate or draw-head, $p$, to which the plow or shovel carrying beams are firmly bolted. The plow is free to swing vertically upon the pivot $o$ and horizontally around the pivot $m$. The plate $n$ has at its top a stud or projection, to which there is attached, by a horizontal pivot, $r$, the forward end of a bar or rod, $s$, which extends horizontally above and parallel with the plow-beam through guide-arms $t$ and $u$, secured to the beam in any suitable manner. The arm $t$ may be conveniently formed on the draw-head $p$, and the arm $u$ on the block or plate used as a spreader between the beams. Around the rod $s$, I mount a strong spiral spring, $w$, bearing at one end against a key or equivalent stop device, $x$, secured to the rod $s$. This spring, pressing in a forward direction against the arm $t$, exerts a constant tendency to urge the plow upward, its lifting effect being somewhat increased as the plow rises from an operative position.

To the rear end of the arm $s$, I pivot an angular dog, $y$, the upper end of which preponderates. When the plow is down in an operative position, the dog stands in the position shown in Fig. 2; but as the plow is lifted and the rod $s$ moved backward through the guide $u$ the dog falls into engagement behind the latter, as shown in Fig. 3, thereby locking the plow in its elevated position. The release of the plow, that it may again descend, is conveniently effected by the attendant placing his foot against the lower end of the dog, which extends below its pivot.

With no provision made to the contrary there would be danger of the plows, when in an elevated position, swinging outward against the wheels. To avoid this evil I provide the draft head or plate $p$ with two upwardly-extending arms, $z$, in such position that when the plow is elevated the arms will bear against or stand in close proximity to the rear edge of the arched or main axle, in which position they prevent the plow from swinging sidewise.

In order to permit a change in the tension of the lifting-spring, the key or other stop, $x$, may be made adjustable in any suitable manner; but I recommend as a simple plan for the purpose the employment of a series of perforations in the bar $s$, and one or more perforations in the key to receive a fastening-pin, as shown in the drawings. I prefer to construct the bar $s$ of two parts laid side by side, as shown in the drawings, so that the ear at the front, the key, and the dog may be inserted between them; but this is not a necessary feature.

I propose, under ordinary conditions, to make use of my plow without a tongue, as represented in Fig. 1, the runners in such case maintaining the arched frame and draft devices in position, notwithstanding the tendency of the lifting-springs to tip them backward. Under certain conditions, however, it is desirable to dispense with the runners and provide the machine with a tongue or draft-pole. I prefer to provide, as shown in Figs. 2 and 3, a pole, F, which may be attached to the top of the frame by a vertical pivot-bolt, $a'$. I propose to use between the pole and the arch a washer, $b'$, and flanged plate $c'$, and also beneath the pole a stay or brace, $d'$, seated on the lower end of the pivot and bolted at its two extremities to the tongue. These parts constitute a swiveling connection, which permits the arched frame to oscillate horizontally beneath the tongue, so that either plow may move in advance of the other.

When the tongue is applied and the runners turned upward out of their operative position, the machine may be used in the same manner as other flexible or parallel cultivators provided with tongues.

While I have represented in the drawings plows consisting of iron beams diverging toward the rear ends and curved downward to receive the shovel, it is to be understood that they may be replaced by wooden or other shovel-carrying beams, such as are commonly known in the art.

It is to be understood that while I prefer to retain the springs $w$, the rods or bars $s$ may be employed, although the springs are omitted, for the purpose of assisting to retain the arched frame in an upright position and prevent it from falling forward.

It is to be noted that the main wheels of my machine have their axes in line with the main frame or arch, so that the entire weight is carried upon the wheels, the axles serving only to maintain the frame against the tipping motion. As a consequence of this arrangement, and of the fact that the runners are pivoted, so that when thrown out of action they are turned forward over the axle, it follows that the poise or balance of the machine is secured upon the wheels when the runners are out of action. In this respect there is a wide distinction between my machine and those machines which have the frame or arch carried by two wheels located in advance thereof, and two wheels or runners located in rear thereof.

Having thus described my invention, what I claim is—

1. In a tongueless cultivator, the arched frame or axle, in combination with the wheel-carrying plates united thereto by vertical pivots and provided with inclined surfaces, and the springs applied, as described, to hold the axle in contact therewith, whereby the swinging motion of the wheels is resisted.

2. The axle having divided ends, in combination with the recessed axle-plates seated therein, the vertical pivot-bolts, and the spring applied to contract the axle upon the plates.

3. In a cultivator, an arched frame or axle, in combination with wheel-carrying plates united to its ends by vertical pivots, said plates having front arms to receive the draft devices and rear arms to which laterally-swinging runners or casters are attached, substantially as described and shown, whereby the frame is maintained in an upright position and the wheels and runners permitted to swing horizontally to follow the changing lines of draft.

4. The arched axle and the two wheels applied directly at the respective ends of said axle to carry its entire weight, in combination with plows coupled to said axle, and trailing runners or casters located in rear of the axle and connected thereto through the medium of vertical pivots, whereby the weight of the machine is carried on the main wheels and the runners required only to prevent the axle from tipping backward.

5. The arched axle having its ends carried by two wheels swiveled thereto to turn or swing horizontally, in combination with rearwardly-extending arms arranged to swing with said wheels, and trailing runners or casters united to the rear ends of said arms by vertical pivots, whereby they are caused to maintain the axle in an upright position, but permitted to swing laterally, and thus permit the course of the wheels and draft to be readily changed.

6. In a wheeled cultivator, the runner provided with a removable and reversible shoe, substantially as described.

7. The combination, with a carrying-arm therefor, of a trailing runner consisting of two separate bars bolted or otherwise secured together at their lower ends, their upper ends being bent forward above and below the carrying-arm, respectively, to receive the pivot, as shown.

8. In a tongueless cultivator, the combination, with an arched wheeled frame or axle, the plows jointed thereto, and the spring-connection between the plows and frame, of elastic trailing runners extending backward from the axle, substantially as described, whereby the axle is sustained in position and the parts relieved from vibration by the yielding of the runners as they pass over inequalities in the surface of the ground.

9. In combination with the wheeled axle and an arm, B, extending rearward therefrom, the runner-carrying arm D, attached to the first-named arm by a horizontal pivot, and a clamping device, $i$, whereby the runner may be fixed in position.

10. In a tongueless cultivator, the combination, with a carrying-arm, B, of the runner-carrying arm D, formed with a semicircular head and pivoted to arm B, and a clamping device, $i$, for securing the arm D in different positions, whereby the vertical adjustment of the runner with respect to the other parts is permitted.

11. In combination with the wheeled frame or axle, the plows jointed thereto to swing vertically and laterally, and the rod or bar extending longitudinally through guides on the plow-beams and pivoted at the forward end, substantially as described, whereby it is caused to hold the frame from falling forward.

12. The arched wheeled axle, the plate attached thereto by a vertical pivot, and the plow-head attached to the plate by a horizontal pivot, in combination with the rod or bar extended through guides on the plow and attached by a horizontal pivot to the plate, as shown.

13. In combination with the wheeled frame or axle, the plow jointed thereto to rise and fall, the rod extended through a guide on the beam and pivoted at the front to a non-rotating part, and the spring applied to the rod, whereby the spring is caused to exert a lifting action on the plow.

14. In a tongueless cultivator, an arched wheeled frame or axle, in combination with runners or casters extending rearward therefrom to maintain it in an elevated position, plows jointed to the frame to swing vertically, and a spring-connection between the frame and beam to exert a lifting effect on the plows, whereby the runners are rendered available to prevent the springs from tipping the frame backward and enable them to aid in raising the plows.

15. The axle and the plow jointed thereto to swing vertically, in combination with the lifting-rod $s$, the lifting-spring $w$, and a dog or locking device to hold said rod against end motion when the plow is in an elevated position.

16. The frame or axle and the plow jointed thereto to swing vertically, in combination with the lifting-rod $s$, the spring $w$, and the pivoted dog having the preponderating upper end, substantially as described, whereby the plow is automatically locked when lifted out of action.

17. In combination with the wheeled axle and a plow jointed thereto to swing vertically and laterally, arms Z, extending from the plow in position to engage the axle or equivalent part when the plow is lifted, whereby lateral motion of the plow is prevented when it is in an elevated position.

In testimony whereof I hereunto set my hand in the presence of two attesting witnesses.

WILLIAM P. BROWN.

Witnesses:
C. W. FENSTEMAKER,
W. H. MOORE.